United States Patent
Hawkins (10) Patent No.: US 9,677,542 B2
(45) Date of Patent: Jun. 13, 2017

(54) METHOD FOR OPERATING A WIND TURBINE

(71) Applicant: SIEMENS AKTIENGESELLSCHAFT, München (DE)

(72) Inventor: Samuel H. Hawkins, Sheffield (GB)

(73) Assignee: SIEMENS AKTIENGESELLSCHAFT (DE)

(*) Notice: Subject to any disclaimer, the term of this patent is extended or adjusted under 35 U.S.C. 154(b) by 8 days.

(21) Appl. No.: 14/715,733

(22) Filed: May 19, 2015

(65) Prior Publication Data

US 2015/0337805 A1   Nov. 26, 2015

(30) Foreign Application Priority Data

May 23, 2014 (EP) ..................... 14169669

(51) Int. Cl.
*F03D 9/00* (2016.01)
*H02P 9/04* (2006.01)
(Continued)

(52) U.S. Cl.
CPC ............ *F03D 7/0276* (2013.01); *F03D 1/00* (2013.01); *F03D 7/028* (2013.01); *F03D 9/25* (2016.05);
(Continued)

(58) Field of Classification Search
CPC .......... F03D 7/0276; F03D 7/028; F03D 9/25; F03D 17/00; F03D 1/00; F16C 19/525; H02K 7/083; H02K 7/1807
(Continued)

(56) References Cited

U.S. PATENT DOCUMENTS

2010/0138267 A1\* 6/2010 Vittal ................. G05B 23/0283
702/184
2010/0143116 A1   6/2010 Zang et al.
(Continued)

FOREIGN PATENT DOCUMENTS

EP   2309122 A1   10/2009
EP   2520797 A1   11/2012
(Continued)

OTHER PUBLICATIONS

Hameed Z. et al.: "Condition monitoring and fault detection of wind turbines and related algorithms: A review"; Renewable and sustainable energy reviews. Elseviers Science, New York, NY, USA. Bd. 13, Nr. 1, Jan. 1, 2009, pp. 1 to 39; XP025496619, ISSN: 1364-0321.
(Continued)

*Primary Examiner* — Tulsidas C Patel
*Assistant Examiner* — Thomas Quigley
(74) *Attorney, Agent, or Firm* — Schmeiser Olsen & Watts LLP (57) ABSTRACT

A method for operating a direct drive wind turbine including determining a temperature difference between at least two components of a bearing, comparing the temperature information with an upper threshold temperature difference between the at least two components of the bearing, limiting rotational speed of a rotor and/or an at least one rotatably supported wind turbine component coupled to the rotor to a value unlike zero yet, below a wind turbine specific nominal rotational speed of the rotor and/or below the wind turbine specific nominal rotational speed of the at least one rotatably supported wind turbine component coupled to the rotor and/or limiting electric power output of the generator to a value unlike zero yet, below a wind turbine specific nominal electric power output of the generator, if the temperature (Continued)

difference between the at least two components of the bearing increases above the upper threshold temperature difference, is provided.

6 Claims, 2 Drawing Sheets

(51) Int. Cl.
    *F03D 7/02*     (2006.01)
    *F03D 1/00*     (2006.01)
    *H02K 7/08*     (2006.01)
    *H02K 9/02*     (2006.01)
    *H02K 9/00*     (2006.01)
    *H02K 7/18*     (2006.01)
    *G01K 13/00*     (2006.01)
    *F16C 19/52*     (2006.01)
    *F03D 17/00*     (2016.01)
    *F03D 9/25*     (2016.01)

(52) U.S. Cl.
    CPC ............ *F03D 17/00* (2016.05); *F16C 19/525* (2013.01); *G01K 13/00* (2013.01); *H02K 7/083* (2013.01); *H02K 7/1807* (2013.01); *H02K 9/005* (2013.01); *H02K 9/02* (2013.01); *F05B 2270/101* (2013.01); *F16C 2233/00* (2013.01); *F16C 2360/31* (2013.01); *Y02E 10/722* (2013.01); *Y02E 10/723* (2013.01)

(58) Field of Classification Search
    USPC ..................................................... 290/44, 55
    See application file for complete search history.

(56) References Cited

U.S. PATENT DOCUMENTS

| 2010/0308594 | A1* | 12/2010 | Numajiri | F16C 19/38 290/55 |
| 2011/0037269 | A1* | 2/2011 | Poon | F16C 19/52 290/55 |
| 2012/0025526 | A1* | 2/2012 | Luo | F03D 15/00 290/44 |
| 2012/0280511 | A1* | 11/2012 | Eriksen | F03D 80/70 290/55 |
| 2013/0214535 | A1* | 8/2013 | Brath | F03D 7/0264 290/44 |
| 2015/0211572 | A1* | 7/2015 | Casazza | F03D 7/00 290/44 |

FOREIGN PATENT DOCUMENTS

| EP | 2587052 A1 | 5/2013 |
| WO | WO 2011082836 A1 | 7/2011 |
| WO | WO 2012025121 A2 | 3/2012 |
| WO | WO 2014024139 A1 | 2/2014 |

OTHER PUBLICATIONS

European Search Report for European Application No. 14169669.0. mailed on Oct. 31, 2014.

* cited by examiner

FIG 1

METHOD FOR OPERATING A WIND TURBINE

CROSS REFERENCE TO RELATED APPLICATIONS

This application claims priority European Application No. EP 14169669.0, having a filing date of May 23, 2014, the entire contents of which are hereby incorporated by reference.

FIELD OF TECHNOLOGY

The following relates to a method for operating a wind turbine, particularly a direct drive wind turbine, the wind turbine comprising a generator comprising a stator and a rotor, with the rotor being rotatably supported relative to the stator by means of at least one bearing, and a control means adapted to control rotational speed of the rotor and/or at least one rotatably supported wind turbine component coupled to the rotor and/or adapted to control electric power output of the generator.

BACKGROUND

It is known that bearings rotatably supporting a rotor of a generator of a wind turbine relative to the stator of the generator of the wind turbine heat up during operation of the wind turbine. It is difficult to maintain an even heat distribution across the bearing, i.e. particularly across respective outer and inner rings. Especially, during initial operation of the wind turbine, i.e. during so called cold start-up situations, the outer and inner rings of the bearing can experience comparatively large temperature differences or gradients, respectively resulting in comparatively high mechanical loads, particularly mechanical stresses, within the bearing.

A known approach for operating a wind turbine involves a temporary or even complete stop of the operation of the wind turbine, i.e. a temporary or even complete shutdown of the wind turbine, when certain temperature differences within the bearing are determined. In this case, the wind turbine does not produce electric power.

Since respective temperature differences within the bearing regularly occur, this approach typically results in often shut-downs of the wind turbine which is an improvable situation in regard of the general aim of continuously operating of the wind turbine and continuously producing electric power.

SUMMARY

An aspect relates to an improved method for operating a wind turbine, particularly a direct drive wind turbine.

A further aspect relates to a method for operating a wind turbine, particularly a direct drive wind turbine, as initially mentioned.

The method is characterised in the steps of:
determining at least one temperature information, which at least indicates a temperature difference between at least two components of the bearing, particularly between an outer ring and an inner ring,
comparing the temperature information with at least one upper threshold temperature information, which at least indicates an upper threshold temperature difference between the at least two components of the bearing,
limiting rotational speed of the rotor and/or the at least one rotatably supported wind turbine component coupled to the rotor to a value unlike zero yet, below a wind turbine specific nominal rotational speed of the rotor and/or below the wind turbine specific nominal rotational speed of the at least one rotatably supported wind turbine component coupled to the rotor and/or limiting electric power output of the generator to a value unlike zero yet, below a wind turbine specific nominal electric power output of the generator, if the temperature difference between the at least two components of the bearing increases above the upper threshold temperature difference.

The method according to embodiments of the invention is particularly applicable for operating a direct drive wind turbine, i.e. a wind turbine having a direct mechanical connection of a rotatably supported rotor hub having at least one rotor blade attached thereto, and the rotatably supported rotor of the generator. Hence, there is particularly no gear box disposed in between the mechanical connection of the rotor hub and the rotor of the generator.

The method according to embodiments of the invention comprises three essential steps which will be described in the following in more detail.

In a first step, at least one temperature information is determined. The temperature information at least indicates a temperature difference between at least two components of the bearing, particularly between an outer ring and an inner ring. The temperature information may additionally, indicate the temperature of at least one component of the bearing, particularly the outer ring, i.e. all annotations regarding a temperature information indicating a temperature difference between at least two components of the bearing also apply to a temperature information which additionally, indicates the temperature of at least one component of the bearing, particularly the outer ring.

The temperature information is typically determined on basis of sensor signals submitted from temperature sensors provided with or at the bearing, i.e. particularly temperature sensors provided with or at the inner ring and/or the outer ring. The terms "inner ring" and "outer ring" also embrace segmented or multi-part constructions of inner rings and/or outer rings.

The temperature information may be determined in continuous or discontinuous manner, i.e. at certain time intervals. It is possible that the temperature information indicates averaged values of the temperature difference between the at least two components of the bearing. The average is taken from a certain period of time, e.g. 10, 20, 30, or 60 seconds.

In a second step, the temperature information is compared with an upper threshold temperature information. The upper threshold temperature information at least indicates an upper threshold temperature difference between the at least two components of the bearing. The upper threshold temperature information may additionally, indicate an upper threshold temperature of at least one component of the bearing. The upper threshold temperature difference between the at least two components of the bearing typically indicates a bearing specific temperature difference above which operation of the specific bearing components and/or the specific bearing may be negatively affected due to thermal influences. Accordingly, the upper threshold temperature of the at least one component of the bearing, which particularly relates to an inner ring and/or an outer ring and/or a rolling element disposed in between the inner ring and the outer ring, typically, indicates a bearing component specific temperature above which operation of the specific bearing component and/or the specific bearing may be negatively affected due to thermal influences.

The upper threshold temperature information, particularly including the upper threshold temperature difference is a wind turbine specific quantity and therefore, typically varies for different scales and/or types of wind turbines.

Comparison of the temperature information with the upper temperature threshold information is typically performed by an appropriate comparison means. The comparison means may include appropriate comparison algorithms. The comparison means may be implemented in the control means of the wind turbine.

The second step therefore, typically includes determining or generating a comparison information, which indicates a comparison result at least indicating, if the determined temperature difference between the at least two components of the bearing increases above the upper threshold temperature difference.

In a third step, a specific limitation of rotational speed of the rotor and/or the at least one rotatably supported wind turbine component coupled to the rotor, hereinafter abbreviately denoted as wind turbine component, to a value unlike zero yet, below a wind turbine specific nominal rotational speed of the rotor and/or the at least one wind turbine component and/or a defined limitation of electric power output of the generator to a value unlike zero yet, below a wind turbine specific nominal electric power output of the generator is performed in the case, if the determined temperature difference between the at least two components of the bearing increases above, i.e. exceeds, the upper threshold temperature difference.

Conversely, if the determined temperature difference between the at least two components of the bearing does not increase above the upper threshold temperature difference, normal operation of the wind turbine is maintained. Hence, the rotational speed of the rotor and/or the at least one wind turbine component is set to the wind turbine specific nominal rotational speed and/or electric power output of the generator is set to the wind turbine specific nominal electric power output.

Hence, given the case that the determined temperature difference between the at least two components of the bearing increases above the upper threshold temperature difference, the method according to embodiments of the invention does not directly lead to a complete shut-down of the wind turbine, but to an operation of the wind turbine with limited or reduced rotational speed of the rotor and/or the at least one wind turbine component and/or to an operation of the wind turbine with limited or reduced electric power output of the generator. This operational mode(s) of the wind turbine may be denoted as "limited or reduced operational mode". In this limited or reduced operational mode, it is aimed that the amount of heat generated internally in the bearing, i.e. particularly in the inner ring, is lowered and the temperature difference between the at least two components of the bearing is consequently reduced, while keeping the electric power output of the generator as high as possible.

Regarding operation of the wind turbine in the aforementioned limited or reduced operational mode, it is possible that operation of the wind turbine is conducted with an adapted operation of at least one cooling means for cooling at least one component of the generator, particularly at least one component of the stator. Adapted operation of the at least one cooling means will be mentioned below in more detail.

The inventive principle is therefore, based on the insight that the creation of heat within respective bearings is proportional primarily to the rotational speed of the rotor and/or respective wind turbine components. The rotational speed of the rotor and/respective wind turbine components is correlated to the electric power output of the generator.

The values the rotational speed the rotor and/or the at least one wind turbine component are limited to, typically lie in the range of 10-90%, particularly in the range of 30-70%, of the wind turbine specific nominal rotational speed of the rotor and/or the at least one wind turbine component during normal operation of the wind turbine. The same applies to the values the electric power output of the generator is limited to. The aforementioned values are only of exemplary nature.

Therefore, even if the determined temperature difference between the at least two components of the bearing increases above the upper threshold temperature difference, the method according to embodiments of the invention generally, allows for maintaining the production of electric power.

Consequently, the method according to embodiments of the invention further allows for reducing heat transfer between the components of the bearing which are relatively lower in temperature, i.e. particularly the outer ring, and the generator, which may reduce a given temperature difference between the outer ring and the inner ring originating from a comparatively "cold" outer ring and a comparatively "hot" inner ring. The temperature difference is based on the fact that the outer ring usually has a considerable lower temperature than the inner ring since the outer ring is more exposed to ambient conditions and therefore likely, to be cooled by ambient air.

Limiting the rotational speed of the rotor and/or the at least one wind turbine component is typically performed by the control means. The control means may include appropriate limiting algorithms. The control means may be a central control unit of the wind turbine or may be implemented in a central control unit of the wind turbine.

The wind turbine component is typically directly mechanically coupled to the rotor, so that rotational movements of the wind turbine component are directly transferred to the rotor. Hence, a rotor hub having at least one rotor blade attached thereto, may be used as a respective wind turbine component, for instance.

According to an embodiment of the method, the aforementioned limited or reduced operation of the wind turbine is not only performed in the case, if the determined temperature difference between the at least two components of the bearing increases above the upper threshold temperature difference, but when a further criterion is fulfilled. This further criterion may be related to the rotational speed of the rotor and/or the wind turbine component.

According to a preferred embodiment of the method, the following steps are conducted:
  additionally, determining at least one rotational speed information, which indicates rotational speed of the rotor and/or the at least one wind turbine component,
  comparing the rotational speed information with at least one minimum operational speed information, which indicates a minimum operational rotational speed of the rotor and/or the at least wind turbine component,
  limiting rotational speed of the rotor and/or the at least one rotatably supported wind turbine component coupled to the rotor to a value unlike zero yet, below a wind turbine specific nominal rotational speed of the rotor and/or below the wind turbine specific nominal rotational speed of the at least one rotatably supported wind turbine component coupled to the rotor and/or limiting electric power output of the generator to a value unlike zero yet, below a wind turbine specific nominal electric power output of the generator, if the temperature difference between the at least two components of the bearing is or increases above the upper threshold temperature difference and, if the rotational speed of the rotor is or increases above the minimum operational rotational speed of the rotor and/or, if the rotational speed of the at least one wind turbine component is or increases above the minimum operational rotational speed of the at least one wind turbine component.

The minimum operational rotational speed of the rotor and/or the at least one wind turbine component typically indicates a rotor specific and/or wind turbine component specific rotational speed below which the wind turbine is not considered to be in operation and is therefore, considered to be out of operation or idling.

The minimum operational speed information, including the minimum operational rotational speed of the rotor as well as the minimum operational rotational speed of the at least one wind turbine component are also wind turbine specific quantities and therefore, typically vary for different scales and/or types of wind turbines.

According to a further embodiment of the method, an applied limitation of rotational speed of the rotor and/or the at least one wind turbine component and/or an applied limitation of electric power output of the generator is cancelled, if at least one cancelling criterion is fulfilled. Regarding the case of a number of respective cancelling criteria, these criteria typically, have to be fulfilled simultaneously.

According to a primary cancelling criterion, an applied limitation of rotational speed of the rotor and/or the at least one wind turbine component and/or an applied limitation of electric power output of the generator is cancelled, if the temperature difference between the at least two components of the bearing decreases below, i.e. falls below, the upper threshold temperature difference between the at least two components of the bearing or below a further threshold temperature difference between the at least two components of the bearing, which further threshold temperature difference is below the upper threshold temperature difference.

By using a respective further threshold temperature difference between the at least two components of the bearing, it may be assured that the temperature difference between respective bearing components is sufficiently below the upper threshold temperature difference so that a cancellation of limitation of the rotational speed of the rotor and/or the at least one wind turbine component and/or a cancellation of limitation of electric power output of the generator will not be conducted too early, i.e. will not be directly subsequently followed by a new limitation.

The further threshold temperature difference between the at least two components of the bearing may be 10-50%, particularly 30%, below the upper threshold temperature difference, for instance. The aforementioned values are only of exemplary nature.

According to a possible secondary cancelling criterion, an applied limitation of rotational speed of the rotor and/or the at least one wind turbine component and/or an applied limitation of electric power output of the generator is cancelled, if the temperature of at least one component of the bearing, particularly the outer ring, increases above a minimum admissible threshold temperature. The purpose of this cancelling criterion is to keep the wind turbine in limited or reduced operational mode until the temperature of the at least one component of the bearing, particularly the outer ring, reaches a point where the inner ring can operate at nominal rotational speed without increasing in temperature so quickly that it reaches a large difference compared to the outer ring.

The minimum admissible threshold temperature is also a wind turbine specific quantity and therefore, typically varies for different scales and/or types of wind turbines. As a mere example, the minimum admissible threshold temperature may be 20° C. This particularly applies to the outer ring as a respective component of the bearing.

Of course, it is also possible that an applied limitation of rotational speed of the rotor and/or the at least one wind turbine component and/or an applied limitation of electric power output of the generator is manually cancelled by a user.

According to a further embodiment of the method, emanating from an applied limitation of rotational speed of the rotor and/or the at least one wind turbine component and/or emanating from an applied limitation of electric power output of the generator, operation of the wind turbine is temporarily completely interrupted, if the temperature difference between the at least two components of the bearing continues increasing above the upper threshold temperature difference and particularly, reaches a maximum admissible threshold temperature difference. In such a manner, situations of comparatively high mechanical loads, i.e. particularly mechanical stresses, due to comparatively large temperature differences within the bearing and therefore, the risk of damages of bearing components or the entire bearing, respectively may be avoided.

According to a further embodiment of the method, after an interruption of the operation of the wind turbine, operation is resumed when at least one resuming criterion is fulfilled. A respective resuming criterion may be fulfilled, if the temperature difference between the at least two components of the bearing decreases below the or a maximum admissible threshold temperature difference between the at least two components of the bearing. Hence, an automatic resumption of operation of the wind turbine may be realised.

The maximum admissible threshold temperature difference is also a wind turbine specific quantity and therefore, typically varies for different scales and/or types of wind turbines. As a mere example, the maximum admissible threshold temperature difference may be 8° C.

Of course, it is also possible that operation of the wind turbine is manually resumed by a user after an interruption of the operation of the wind turbine.

According to a further embodiment of the method, after resuming operation of the wind turbine, operation of the wind turbine is at least temporarily conducted with a limitation of rotational speed of the rotor and/or the at least one wind turbine component to the or a value unlike zero, yet below a wind turbine specific nominal rotational speed of the rotor and/or the at least one wind turbine component and/or with a limitation of electric power output of the generator to the or a value unlike zero, yet below the wind turbine specific nominal electric power output of the generator. In such a manner, aforementioned problems which may occur during a cold start-up of the wind turbine may be avoided or at least reduced.

According to a further embodiment of the method, resuming operation of the wind turbine after an interruption of the operation of the wind turbine is conducted with an adapted operation of at least one cooling means for cooling at least one component of the generator, particularly at least one component of the stator. In such a manner, cooling of the generator may be adapted to the specific situation of a cold start-up of the wind turbine thereby minimising large temperature gradients within the bearing, for instance. The term cooling means embraces all kinds of devices allowing for cooling of at least one component of the generator, i.e. particularly agitating means for agitating a cooling fluid along and/or through the at least one component of the generator. Hence, agitating means may be built as or may comprise fans, pumps, etc.

As mentioned above, operation of the wind turbine with an adapted operation of at least one cooling means for cooling at least one component of the generator, particularly at least one component of the stator is also possible during operation of the wind turbine in the aforementioned limited or reduced operational mode.

In either case, the operation of the at least one cooling means for cooling at least one component of the generator, particularly at least one component of the stator, may be adapted in such a manner that an activation temperature of at least one component of the generator at which cooling of the at least one component of the generator is activated is increased above a wind turbine specific nominal activation temperature which is used during normal operation of the wind turbine.

The increased activating temperature may be 10-50%, particularly 30%, above the wind turbine specific activation temperature, which is used during normal operation of the wind turbine. The aforementioned values are only of exemplary nature.

Moreover, the invention relates to a wind turbine, particularly a direct drive wind turbine. The wind turbine, i.e. particularly a control means of the wind turbine, is adapted to perform the method. Therefore, all annotations regarding the method also apply to the wind turbine.

The wind turbine comprises at least:
- a generator comprising a stator and a rotor, with the rotor being rotatably supported relative to the stator by means of at least one bearing,
- at least one temperature determining means adapted to determine at least one temperature information, which at least indicates a temperature difference between at least two components of the bearing, particularly an outer ring and an inner ring,
- at least one comparison means adapted to compare the temperature information with at least one upper threshold temperature information, which at least indicates an upper threshold temperature difference between the at least two components of the bearing, and
- a control means adapted to control rotational speed of the rotor and/or at least one rotatably supported wind turbine component coupled to the rotor and/or to control electric power output of the generator.

According to an embodiment of the wind turbine, the wind turbine further comprises a rotational speed determining means adapted to determine at least one operational speed information, which indicates the rotational speed of the rotor and/or the at least wind turbine component, wherein the comparison means is adapted to compare the operational speed information with at least one minimum rotational speed, which indicates a minimum operational rotational speed of the rotor and/or the at least one wind turbine component.

Both the comparison means and the rotational speed determining means may be implemented in the control means.

BRIEF DESCRIPTION

Some of the embodiments will be described in detail, with reference to the following figures, wherein like designations denote like members, wherein.

DETAILED DESCRIPTION

Figure 1:
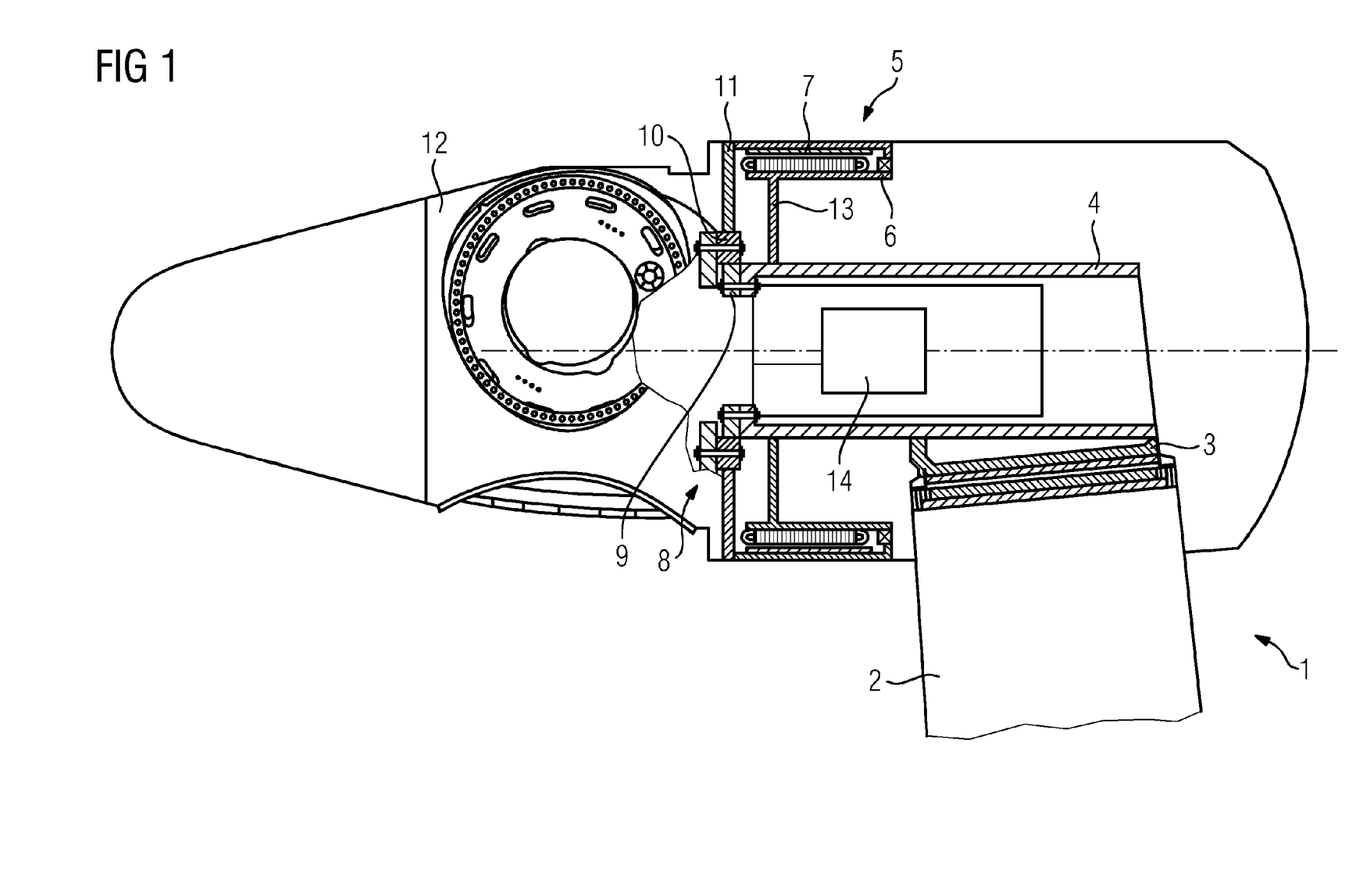
FIG. 1 shows a principle drawing of a wind turbine according to an exemplary embodiment.

FIG. 1 shows a principle drawing of a wind turbine 1 according to an exemplary embodiment of the invention. The wind turbine 1 is a direct drive wind turbine.

The wind turbine 1 comprises a tower construction 2 which is fixed to the ground. A tower connector 3 is attached to the free ending of the tower construction 2. The tower connector 3 supports a main shaft 4 of the wind turbine 1.

The wind turbine 1 further comprises a generator 5. The generator 5 comprises a stator 6 and a rotor 7. The rotor 7 is rotatably supported relative to the stator 6 by means of a bearing 8. The bearing 8 may be denoted as main bearing of the wind turbine 1. The bearing 8 comprises an inner ring 9 and an outer ring 10.

The inner ring 9 is supported on the main shaft 4 in torque-proof manner. The outer ring 10 is connected to the rotor yoke 11. The rotor yoke 11 supports a rotor hub 12 having a number of rotor blades (not shown) attached thereto. The rotor yoke 11 also supports the rotor 7. Both the rotor yoke 11 and the rotor hub 12 may be deemed as rotatably supported wind turbine components coupled to the rotor 7. The stator 6 is supported by a stator yoke 13 which is connected to the main shaft 4.

In contrast to the inner ring 9, the outer ring 10 is exposed to ambient air. Therefore, cooling of the outer ring 10 is possible by ambient air. Compared with the outer ring 10, the inner ring 9 is disposed at a radially inner position so that cooling of the inner ring 9 by ambient air is not possible.

Thus, the inner ring 9 usually has a higher temperature than the outer ring 10. In such a manner, temperature differences or gradients, respectively may occur within the bearing 8, i.e. particularly between the inner ring 9 and the outer ring 10. Respective temperature differences or gradients, respectively may further be influenced by different masses, thermally conductive coatings of the inner ring and/or the outer ring 10 etc.

The wind turbine 1 further comprises a control means 14. The control means 14 may be denoted as the central control unit for controlling operation of the wind turbine 1 and its functional components. The control means 14 is particularly, adapted to control rotational speed of the rotor 7 and thus, respective rotatably supported wind turbine components coupled to the rotor 7, i.e. particularly the rotor yoke 11 and the rotor hub 12, and to control electric power output of the generator 5.

The control means 14 comprises or communicates with a temperature determining means (not shown). The temperature determining means is adapted to determine a temperature information, which indicates the temperature of at least one component of the bearing 8, particularly the inner ring 9 and/or the outer ring 10, and/or a temperature difference between at least two components of the bearing, particularly between the inner ring 9 and the outer ring 10. The temperature determining means therefore, may comprise or may communicate with temperature sensors (not shown) provided with or at the bearing 8 or respective components of the bearing 8, i.e. particularly the inner ring 9 and the outer ring 10.

The control means 14 further comprises or communicates with a comparison means (not shown). The comparison means is adapted to compare respective temperature information with at least one upper threshold temperature information and, if need be a maximum threshold temperature information. The at least one upper threshold temperature information indicates an upper threshold temperature difference between the at least two components of the bearing 8, the maximum threshold temperature information indicates a maximum admissible threshold temperature difference between the at least two components of the bearing 8. Therefore, the comparison means may include appropriate comparison algorithms.

The control means 14 further communicates with a cooling means (not shown) adapted to cool at least one component of the generator 5, particularly at least one component of the stator 6, e.g. respective electrical windings. The cooling means may comprise agitating means (not shown) for agitating a cooling fluid, e.g. air or water, along and/or through the at least one component of the generator 5, particularly the at least one component of the stator 6. The agitating means may be built as or may comprise fans, pumps, etc.

In contrast to the inner ring 9, the outer ring 10 is exposed to the cooling fluid used by the cooling means adapted to cool at least one component of the generator 5. Therefore, a transfer of heat from the outer ring 10 is possible by the cooling means. Compared with the outer ring 10, the inner ring 9 is disposed at a radially inner position relative to the centre axis of the main shaft 4 so that a transfer of heat from the inner ring 9 by the cooling means is typically, not possible.

The control means 14 comprises a specific control method for operating the wind turbine 1. The control method may be implemented by appropriate control algorithms, control settings, and the like stored in the control means 14. In such a manner, a method for operating a wind turbine 1 according to exemplary embodiments of the invention may be realised (cf. FIG. 2, 3).

Figure 2:
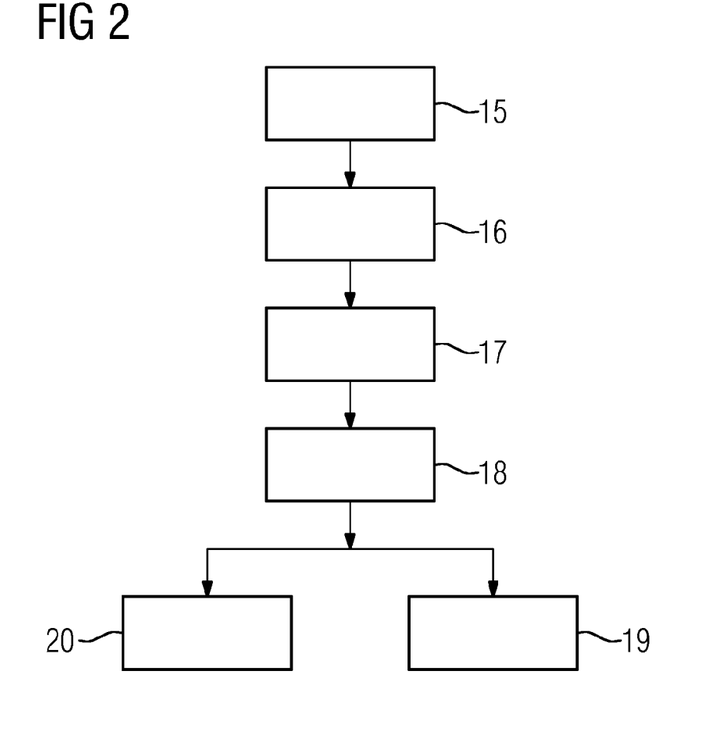
FIG. 2 shows a flow chart of a method for operating a wind turbine according to an exemplary embodiment and FIG. 3 shows a flow chart of a method for operating a wind turbine according to an exemplary embodiment.

FIG. 2 shows a flow chart of the method for operating a wind turbine 1 according to an exemplary embodiment of the invention.

In a first step (cf. box 15), a temperature information is determined. A respective temperature information particularly indicates a temperature difference between at least two components of the bearing 8, i.e. particularly a temperature difference between the inner ring 9 and the outer ring 10. A respective temperature information may additionally, indicate the temperature of at least one component of the bearing 8, particularly the outer ring 10.

In a second step, the temperature information is compared with an upper threshold temperature information (cf. box 16). A respective upper threshold temperature information particularly, indicates an upper threshold temperature difference between the respective components of the bearing 8.

The upper threshold temperature difference indicates a bearing 8 specific temperature difference above which operation of the bearing components and/or the specific bearing 8 may be negatively affected due to thermal influences. As a mere example, the upper threshold temperature difference may be 6° C.

Generally, the temperature information may also be compared with a maximum admissible threshold temperature difference between the respective components of the bearing 8. As a mere example, the maximum admissible threshold temperature difference may be 8° C.

Likewise, at least one operational speed information is determined. The at least one operational speed information indicates the rotational speed of the rotor 7 and/or at least one rotatably supported wind turbine component coupled to the rotor 7, e.g. the rotor yoke 11 or the rotor hub 12. In the present embodiment, the operational speed information indicates the rotational speed of the rotor 7.

The operational speed information is compared with at least one minimum operational rotational speed information (cf. box 17). The minimum operational rotational speed information indicates a minimum operational rotational speed of the rotor 7 and/or at least one rotatably supported wind turbine component coupled to the rotor 7. In the present embodiment, the minimum operational speed information indicates a minimum operational rotational speed of the rotor 7. The minimum operational rotational speed of the rotor 7 indicates a rotor specific rotational speed below which operation of the wind turbine 1 is considered non-operational or idling, respectively. As a mere example, the minimum operational rotational speed of the rotor 7 may be 4 RPM (revolutions per minute).

In a third step, a specific limitation of the rotational speed of the rotor 7 to a value unlike zero yet, below the wind turbine specific nominal rotational speed of the rotor 7 is performed, if the determined temperature difference between the at least two components of the bearing 8 increases above the upper threshold temperature difference and, if the rotational speed of the rotor 7 increases above the minimum operational rotational speed of the rotor 7 (cf. box 18). As a mere example, the nominal rotational speed of the rotor 7 may be ca. 13 RPM. In this exemplary case, the rotational speed of the rotor 7 may be limited to 8 RPM, for instance.

Limitation of the rotational speed of the rotor 7 also leads to a corresponding limitation of electric power output of the generator 5 since the rotational speed of the rotor 7 is correlated to the electric power output of the generator 5.

However, it is also possible to directly limit electric power output of the generator 5 to a value unlike zero yet, below a wind turbine specific nominal electric power output of the generator 5 in the aforementioned case.

Hence, given the aforementioned case, the control means 14 does not interrupt operation of the wind turbine 1, but will control operation of the wind turbine 1 with limited or reduced rotational speed of the rotor 7 and/or with limited or reduced electric power output of the generator 5. This operational mode of the wind turbine 1 may be denoted as "limited or reduced operational mode".

In this case, the control means 14 may also adapt the operation of the at least one cooling means for cooling at least one component of the generator 5, particularly at least one component of the stator 6. Thereby, the operation of the at least one cooling means is adapted in such a manner that an activation temperature at which cooling of the at least one component of the generator 5 is activated is increased above a wind turbine specific nominal activation temperature which is used during normal operation of the wind turbine 1. As a mere example, an activation temperature may be increased from a nominal value of 60° C. to a value of 80° C. allowing for a better heat exchange between the generator 5 and the bearing 8, particularly the outer ring 10, which gives rise to a reduction of temperature differences or gradients, respectively within the bearing 8.

Emanating from a respective limited or reduced operational mode, an applied limitation of rotational speed of the rotor 7 is automatically cancelled or cleared, if the temperature difference between the at least two components of the bearing 8 decreases below the upper threshold temperature difference between the at least two components of the bearing 8 or below a further threshold temperature difference between the at least two components of the bearing 8, which is below the maximum admissible threshold temperature difference (cf. box 19) and, if need be, if, additionally, the temperature of the at least one component of the bearing 8, particularly the outer ring 10, is above a minimum admissible threshold temperature. As mere examples, the further threshold temperature difference may be 4° C. and the minimum admissible threshold temperature may be 20° C. Of course, it is also possible that an applied limitation of rotational speed of the rotor 7 is manually cancelled or cleared by a user.

In contrast, when emanating from an applied limitation of rotational speed of the rotor 7, operation of the wind turbine 1 is temporarily completely interrupted, if the temperature difference between the at least two components of the bearing 8 continues increasing above the upper threshold temperature difference and particularly, reaches a maximum admissible threshold temperature difference (cf. box 20). As a mere example, the maximum admissible threshold temperature difference may be 8° C.

Figure 3:
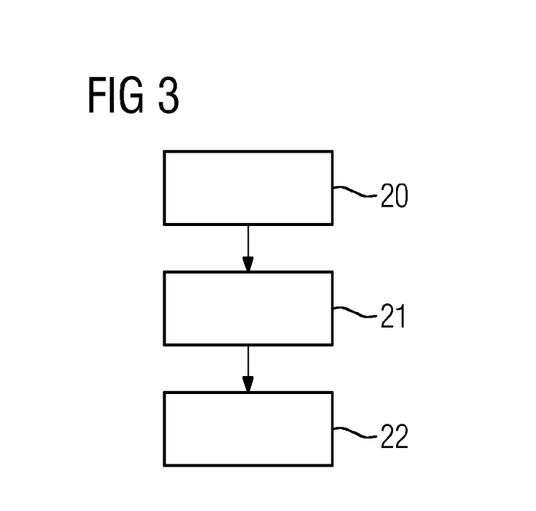

In this case, the control means 14 may implement the method depicted in the flowchart of FIG. 3.

Hence, when emanating from a respective interruption of the operation of the wind turbine 1, operation of the wind turbine 1 is resumed when at least one resuming criterion is fulfilled. The resuming criterion is fulfilled, if the temperature difference between the at least two components of the bearing 8 decreases below the maximum admissible threshold temperature difference. This case is indicated by box 21.

However, after resuming operation of the wind turbine 1, operation of the wind turbine 1 is at least temporarily conducted with a limitation of rotational speed of the rotor 7 to the aforementioned value or another value unlike zero, yet below the wind turbine specific nominal rotational speed of the rotor 7 and/or with a limitation of electric power output of the generator 5 to the or a value unlike zero, yet below the wind turbine specific nominal electric power output of the generator 5 (cf. box 22).

In this case, the control means 14 may also adapt the operation of the at least one cooling means for cooling at least one component of the generator 5, particularly at least one component of the stator 6. Thereby, the operation of the at least one cooling means may be adapted in such a manner that an activation temperature at which cooling of the at least one component of the generator 5 is activated is increased above a wind turbine specific nominal activation temperature which is used during normal operation of the wind turbine 1. As a mere example, an activation temperature may be increased from a nominal value of 60° C. to a value of 80° C. allowing for a better heat exchange between the generator 5 and the bearing 8, particularly the outer ring 10, which gives rise to a reduction of temperature differences or gradients, respectively within the bearing 8.

According to the described method, unnecessary interruptions of operation of the wind turbine 1 may be avoided. Moreover, the time needed for resuming full electric power output of the generator 5 is reduced. Aside, manual interaction with the wind turbine 1 by enabling the wind turbine 1 to automatically reduce rotor speed and/or electric power output and therefore, bearing 8 heat production may be reduced.

Although the present invention has been described in detail with reference to the preferred embodiment, the present invention is not limited by the disclosed examples from which the skilled person is able to derive other variations without departing from the scope of the invention.

The invention claimed is:

1. A method for operating a direct drive wind turbine the wind turbine including a generator having a stator and a rotor, with the rotor being rotatably supported relative to the stator by at least one bearing, and a control device adapted to control rotational speed of the rotor and/or at least one rotatably supported wind turbine component coupled to the rotor and/or configured to control electric power output of the generator, the method comprising:

determining at least one temperature information, wherein the at least one rotatably supported component is one of an outer ring and an inner ring and wherein the at least one temperature information indicates a temperature difference between the outer ring and the inner ring while the outer ring and the inner ring are rotating with respect to each other; and comparing the at least one temperature information with at least one upper temperature information, wherein the at least one upper temperature information indicates an upper threshold temperature difference between the inner ring and the outer ring of the at least one bearing;

limiting rotational speed of the rotor and/or the at least one rotatably supported wind turbine component coupled to the rotor to a non-zero value yet, below a wind turbine specific nominal rotational speed of the rotor and/or below the wind turbine specific nominal rotational speed of the at least one rotatably supported wind turbine component coupled to the rotor and/or limiting electric power output of the generator to a non-zero value yet, below a wind turbine specific nominal electric power output of the generator, when the temperature difference between the inner ring and the outer ring of the bearing increases above the upper threshold temperature difference, wherein, when the wind turbine is operated with limited rotational speed of the rotor and/or the at least one rotatably supported wind turbine component coupled to the rotor and wherein the limited rotational speed is at the non-zero value yet, below the wind turbine specific nominal rotational speed of the rotor and/or below the wind turbine specific nominal rotational speed of the at least one wind turbine component coupled to the rotor, operation of the wind turbine is conducted with an adapted operation of at least one cooling device for cooling at least one component of the generator, wherein the operation of the at least one cooling device for cooling at least one component of the generator is adapted in such a manner that an activation temperature of at least one component of the generator at which cooling of the at least one component of the generator is activated is increased above a wind turbine specific nominal activation temperature which is used during normal operation of the wind turbine.

2. The method according to claim 1, further comprising:

additionally, determining at least one rotational speed information, wherein that at least one rotational speed information indicates rotational speed of the rotor and/or the at least one rotatably supported wind turbine component coupled to the rotor;

comparing the rotational speed information with at least one minimum operational speed information, wherein the at least one minimum operational speed information indicates a minimum operational rotational speed of the rotor and/or the at least one rotatably supported wind turbine component coupled to the rotor; and limiting rotational speed of the rotor and/or the at least one rotatably supported wind turbine component coupled to the rotor to the non-zero value yet, below the wind turbine specific nominal rotational speed of the rotor and/or below the wind turbine specific nominal rotational speed of the at least one rotatably supported wind turbine component coupled to the rotor and/or limiting electric power output of the generator to the non-zero value yet, below the wind turbine specific nominal electric power output of the generator, when the temperature difference between the inner ring and the outer ring of the bearing increases above the upper threshold temperature difference and, when the rotational speed of the rotor increases above the minimum operational rotational speed of the rotor and/or, when the rotational speed of the at least one rotatably supported wind turbine component coupled to the rotor increases above the minimum operational rotational speed of the at least one rotatably supported wind turbine component coupled to the rotor.

3. The method according to claim 1, wherein an applied limitation of rotational speed of the rotor and/or the at least one rotatably supported wind turbine component coupled to the rotor and/or an applied limitation of electric power output of the generator is cancelled, when the temperature difference between the inner ring and the outer ring of the bearing decreases below the upper threshold temperature difference between the inner ring and the outer ring of the at least one bearing or below a further threshold temperature difference between the inner ring and the outer ring of the bearing, which further threshold temperature difference is below the upper threshold temperature difference, and, additionally when, the temperature of the at least one component of the at least one bearing, is above a minimum admissible threshold temperature.

4. The method according to claim 1, wherein a rotor hub having at least one rotor blade attached thereto is used as the at least one rotatably supported wind turbine component coupled to the rotor.

5. A direct drive wind turbine, comprising:
a generator comprising a stator and a rotor, with the rotor being rotatably supported relative to the stator by at least one bearing;

at least one temperature determining device configured to determine at least one temperature information, which indicates a temperature difference between at least one rotatably supported wind turbine component, wherein the one wind turbine component is one of an outer ring and an inner ring;

at least one comparison device configured to compare the temperature information with at least one upper threshold temperature information, which indicates an upper threshold temperature difference between the inner ring and the outer ring of the bearing, and a control device configured to control rotational speed of the rotor and/or at least one rotatably supported wind turbine component coupled to the rotor and/or to control electric power output of the generator based upon the temperature difference between the outer ring and the inner ring; and a cooling device, wherein the operation of the at least one cooling device for cooling the inner ring and the outer ring of the bearing and is adapted in such a manner that an activation temperature of at least the inner ring and the outer ring of the bearing at which cooling of the inner ring and the outer ring of the bearing is activated is increased above a wind turbine specific nominal activation temperature which is used during normal operation of the wind turbine.

6. The wind turbine according to claim 5, wherein a rotational speed determining device adapted to determine at least one operational speed information, wherein the at least one operational speed information indicates the rotational speed of the rotor and/or the at least one rotatably supported wind turbine component coupled to the rotor, wherein the comparison device is adapted to compare the operational speed information with at least one minimum operational rotational speed, wherein the at least one minimum operational rotational speed indicates a minimum operational rotational speed of the rotor and/or a minimum operational rotational speed of the at least one rotatably supported wind turbine component coupled to the rotor.

* * * * *